Sept. 12, 1950 J. A. HAESELER 2,521,790
REFLEX CAMERA WITH FINDER FOCUSING SYSTEM
Filed Sept. 1, 1945
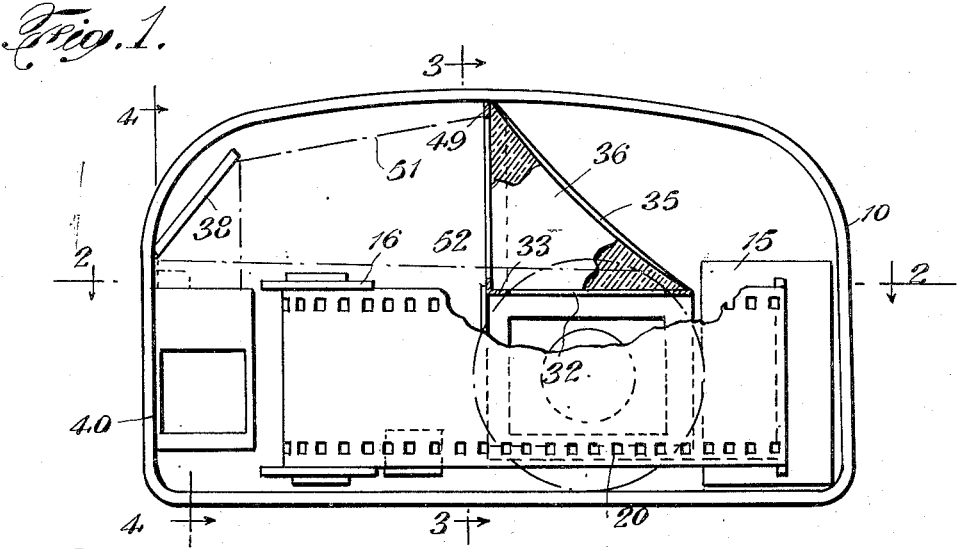
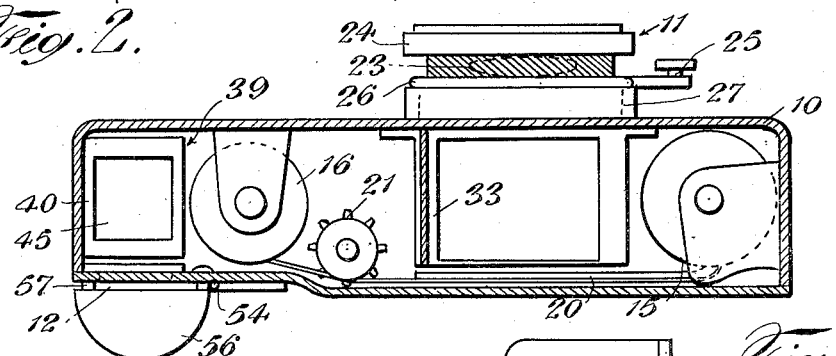
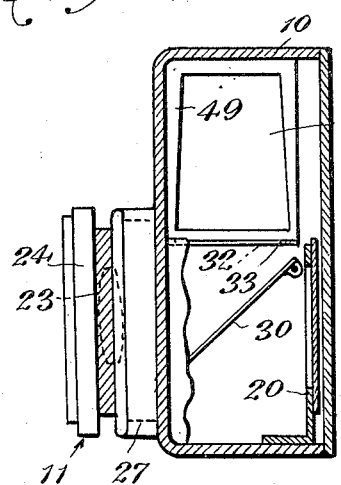
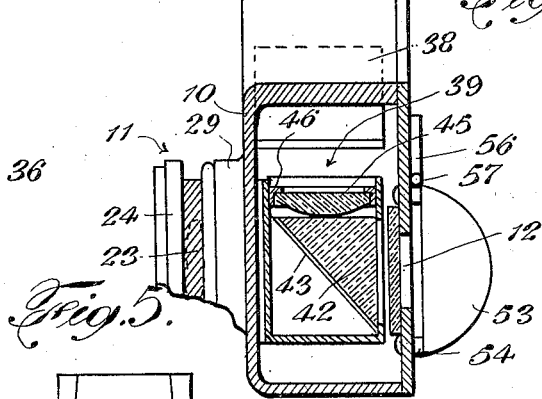
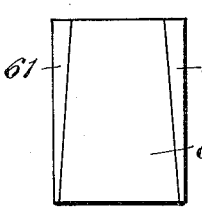
INVENTOR
John A. Haeseler
BY
Emery, Varney, Whittemore & Dix
ATTORNEY Patented Sept. 12, 1950

2,521,790

UNITED STATES PATENT OFFICE 2,521,790

REFLEX CAMERA WITH FINDER FOCUSING SYSTEM

John A. Haeseler, Woodbridge, Conn.

Application September 1, 1945, Serial No. 614,021

6 Claims. (Cl. 95—42)

One of the chief handicaps in photography has been the inability to see exactly the field and image being photographed, and the focus, without imposing limitations such as delay in making the exposure, or increased bulk and weight of equipment. Ordinary finders and distance scales on folding cameras do not show the photographer whether an object is actually in focus, and they are not practical for close-up work.

The single lens reflex camera makes it possible to see the exact field of the picture, as well as the focus, but reflex cameras have been larger and heavier than other types of cameras taking the same size picture. If equipped with a hood they are bulky, and if not so equipped the extraneous light falling on the ground glass usually makes it necessary to focus with a wide stop and then close down to the proper stop for the exposure or for the depth of focus desired. This closing down is almost always done manually and results in a delay between focusing and the actual taking of the picture, and this delay is a real handicap, particularly when using the camera to photograph moving objects.

Although twin-lens reflex cameras overcome the need of closing down the lens between the time of focusing and the taking of the picture, the problem of parallax, and the increased camera size tend to offset this advantage. In order to make a reflex camera suitable for both horizontal and vertical pictures, the camera is designed to take a square picture, or a revolving back is used, and the size and weight of the camera are increased.

Another disadvantage of the reflex camera has been that while the top and bottom of the image on the ground glass are seen in correct relation, the sides are reversed, that is, the right is seen on the left, and the left on the right. Only after long practice does the operator of a reflex camera overcome the tendency to move the camera in the opposite direction when trying to follow action.

For the still camera there has been no very satisfactory combined finder and focusing system. The coupled range finder has been widely used but in all but the most elaborate of such range finders parallax results in the cutting off of the sides of the picture on close views, and such focusing equipment can ordinarily not be used closer than about 3½ ft. Each lens needs its own racking structure varying for lenses of different focal lengths; and range finders and couplings require extreme accuracy in the manufacture and assembly of the parts.

It is an object of this invention to provide an improved camera with a combined finder and focusing system that is suitable for small, compact cameras, as well as for other cameras. The combined finder and focusing system of this invention utilizes the camera lens and comprises an optical system that magnifies and shows the actual image that will be photographed. The system is contained within the camera casing but does not require any substantial increase in the size of the camera. The optical system preferably terminates at an eyepiece located at a corner of the back of the camera casing.

One feature of the invention is concerned with a relation of the film spools and the optical system of the finder whereby the optical system can pass up from between the spools and then sideways in the same zone of the camera casing as the spools. The advantage of such a relation is that the optical system does not require any substantial increase in the depth of the casing than is made necessary by the size of the film spool flanges.

With the finder of this invention the image seen through the eyepiece is erect and the sides are in correct relation, that is, right is seen as right, and left as left. In order to permit the eye to focus on a ground glass at a short distance from the eye, one or more lenses are provided in the optical system of this invention, and these lenses serve the further purpose of magnifying the image for more accurate focusing. Furthermore, the finder and focusing system of this invention serves equally well when the camera is held in position for taking either horizontal or vertical pictures.

Other objects, features and advantages of the invention will appear or be pointed out as the description proceeds.

In the drawings, forming a part hereof, in which like reference characters indicate corresponding parts of all the views, Figure 1 is a rear view, partly in section, showing a camera equipped with the finder of this invention and with the back of the camera removed.

Figures 2, 3 and 4 are sectional views taken along the lines 2—2, 3—3 and 4—4, respectively, of Figure 1, with the back on the camera.

Figure 5 is a detail view illustrating the masking when the mirror reflector is used.

The camera shown in the drawings includes a casing 10 with supporting means for a lens assembly 11 connected to the front of the casing, and a finder eyepiece 12 at the back of the casing. The lens assembly is at an intermediate region of the front of the camera casing, but need not be centrally located. The eyepiece is a window in the construction illustrated, but may be a lens in other embodiments, or merely an aperture. There are spools 15 and 16 rotatable in bearings in the casing 10, and these spools rotate about parallel vertical axes. The film 18 is wound from the spool 15 to the spool 16 across a frame 20 directly behind the lens. A film sprocket 21 engages the holes in the edge of the film and controls the length of film moved with each operation of the winding mechanism. The frame 20 has an opening of the size of the picture to be taken on the film. Such structure for holding and moving film is well known and no further illustration of it is necessary for a complete understanding of this invention.

The lens assembly is conventional, and for purposes of this invention it is sufficient to understand that a lens 23 is held in a barrel 24 that moves toward and from the plane of the frame 20 when rotated about the axis of the lens by means of a handle 25 extending out from one side of a sleeve 26. This sleeve turns in a bearing 27 on the front of the camera casing. The inside of the sleeve 26 has a steep pitch, multiple lead thread. This thread engages a corresponding thread on the outside of the lens barrel shown in Figures 2, 3 and 4. Such apparatus for focusing cameras is well understood in the art.

The lens 23 serves as the objective for the finder and focusing system. Between the lens 23 and the frame 20 there is a mirror 30 that reflects light from the lens upward against a ground glass 32. By having the first reflection of the light beam upward and substantially parallel to the axes of the spools 15 and 16, and then sideways above the level of the spools, the optical system of this invention can be used in the same casing with the film spools, the flanges of which extend across the major part of the depth of the space within the casing. The first reflection can, of course, be downward, parallel to the spool axes, and is when the camera is upside down.

When focusing the camera, the mirror 10 is in the position shown in Figure 3 of the drawing, but this mirror is hinged to the camera casing at the upper edge of the mirror so that the mirror can be swung upward and out of the way when the camera is used to take the picture. This is a conventional construction in reflex cameras.

A mask 33 around the edges of the ground glass limits the field shown on the ground glass to the same field that is thrown on the film through the openings in the frame 20. The area provided by the mask 33 around the image on the ground glass, makes it possible to view this image through the finder system without seeing any of the adjacent camera structure. The ground glass 32 is so spaced from the reflecting surface or mirror 30 that adjustment of the lens 23 to focus an image on the ground glass 32 will exactly focus the image on the film behind the frame 20. This reflection is the same as that employed in other reflex cameras, and the image on the ground glass 32 shows the top and bottom of the field in correct relation but right and left are reversed. No description of the reflex camera mechanism is necessary for a full understanding of this invention.

Above the ground glass 32 there is another reflector 35 for changing the direction of the light so that it is thrown sideways, with respect to the actual object seen, and toward the left hand end of the camera as viewed in Figure 1. In the illustrated construction a prism 36 is used as the reflector above the ground glass 32 and the ground glass is made by providing a ground glass surface on the bottom face of the prism 36. The reflecting surface is the angular face of the prism. It is preferably silvered to give a somewhat brighter reflection, but the angular face of the prism can be used as a reflector without silver surfacing. This reflector 35 is slightly curved so that it can be of smaller size and still reflect the entire area of the ground glass. A plane surface for the reflector 35 can be used if desired.

Near the left-hand end of the casing 10 there is a reflector 38 for changing the direction of the light beam so that it passes downward to a final reflector assembly 39.

This assembly 39 includes a frame 40 that is fastened to the inside of the camera casing. Within the frame 40 there is a prism 42 having a sloping face 43 for turning the direction of the light beam toward the eyepiece 12. The face 43 of the prism 42 is preferably silvered to increase the brightness of the image.

A lens 45 is located just above the prism 42. This lens makes it possible for a person's eye located at the eyepiece 12 to focus on the ground glass 42 even though the ground glass is close to the eye. The lens 45 is held in a frame 46 which has a limited sliding movement up and down in the box-like frame 40 in which the prism 42 is held. This movement permits adjustment of the optical system, for individuals who do not have normal eyesight, or substitute of additional lenses can be employed to compensate for abnormal vision. It will be evident that this lens 45 can be at other locations within the optical system, but the focal length of the lens 45 must be different for different locations within the system.

The reflection of the light beam from the reflector 35 to the reflector 38 changes the relation of the right and left sides of the field as will be evident from the dot and dash lines 51 and 52 which represent the extreme edges of the image. Since the right and left sides of the field are reversed in the image on the ground glass 32, the subsequent reversal of the sides by the reflectors 35 and 38 produces an image at the eyepiece of the optical system with the right and left sides of the field in proper relation.

All of the reflecting surfaces can be mirrors. A prism can be used in place of the mirror reflector 38, and a compound prism can be employed to take the place of the simple prism 36 and reflecting mirror 38. Such a compound prism would have angular faces corresponding to the reflector 35 and mirror 38, and turn the light beam in the same way as the illustrated optical system. It is a feature of the invention, however, that the reflectors 35 and 38 are separated, instead of being combined in a single compound prism, and this separation makes it practical to locate the eyepiece 12 at one corner of the casing for more convenient eye-level focusing.

The reflecting surfaces of the mirrors, or the contour of the prisms, may be shaped to produce an enlarged or a reduced image. For example, if the reflector 35 is a reducing mirror, it can be of smaller size and still reflect the entire field of the ground glass. To off-set the reduction in image size when a reducing reflector is used above the ground glass, the reflector 38 can be shaped to enlarge the image, or a lens system can be used to obtain the enlargement.

By having the eyepiece 12 at the corner of the casing it is possible for a person to hold the camera so that he can place his eye up against the eyepiece without having the back of the camera strike against his nose. The comparatively small eyepiece held close to the eye locates the camera in such a position that the head blocks any direct rays of light from getting into the optical system and thus makes it possible to focus at the stop used for photographing.

It is not necessary to have the eyepiece in a different corner of the casing for right-eyed or left-eyed persons because the eyepiece can be brought up against the other eye by merely turning the camera upside down. This corner location of the eyepiece makes it possible to bring the eyepiece up against either the right or left eye for either horizontal or vertical pictures.

When using the camera under adverse conditions, for example, when there is sunlight or other bright light coming from one side, the image seen through the eyepiece 12 appears brighter if an eyeshield 53 is used on the side of the eyepiece nearest bright light. Figure 2 shows the shield 53 connected to the back of the casing by a hinge 54 and folded down against the casing into a protected position when not in use. There is a depressed region in the back of the casing around the eyepiece 12 for receiving the shield 53 when folded in against the casing.

Figure 4 shows the shield 53 in its extended position for protecting an observer's eye from sunlight, or other bright light coming from one side. There is a similar shield 56 hinged to the back of the camera by a hinge 57 extending at right angles to the hinge 54. This second shield 56 is used when the camera is held in a vertical position.

It will be apparent from Figure 1 that the prism 36 is oversize, that is, both the face through which light enters the prism, and the light outlet face of the prism, are longer and wider than the cross-section of the light beam that is transmitted through the optical system. This means that neither of the triangular ends of the prism are used. The purpose of blanking off the triangular ends of the prism is to block off extraneous images that are otherwise visible. A mask 49 immediately beyond the light-outlet face of the prism 36 blocks off the light reflected from the ends of the face 35 and also blocks the view of the sides of the prism and the side edges of the reflecting surface 35. Obstructing the view of the edges avoids an optical illusion that makes lines appear to converge toward one end of the field.

When a mirror is used for the reflector 35, the masking 49 can be employed as with the prism, and/or masking can be applied along the sides of the mirror reflector. The width of such a mirror reflector, either by masking or otherwise, should be made to decrease toward the upper end of the mirror so that nothing outside of the mask 33 is visible.

Figure 5 shows a mirror reflector 60 that can be used in place of the reflecting surface 35 of prism 36. This figure is a view looking at the reflector along a plane corresponding to the plane 3—3 of Figure 1. Figure 5 also shows masking 61 along the edges of the mirror 60, and the way in which the masking converges and the reflecting area of the mirror progressively decreases toward its upper end.

The optical system illustrated obtains a bright image with top and bottom, as well as the right and left sides, in correct relation, and obtains a magnified image which represents the image to be formed on the film, without increasing appreciably the depth of the camera and without requiring much increase in the length of the camera casing. The preferred embodiment of the invention has been illustrated and described. Terms of orientation are, of course, relative. Changes and modifications can be made without departing from the invention as defined in the claims.

I claim as my invention:

1. A roll-film camera including a casing, supporting means for holding two film spools for rotation about spaced, upright and parallel axes at opposite sides of the casing and in a fore-and-aft zone of the casing, a support at the front of the casing for holding a lens for admitting light to expose a length of film between the spools, a reflex finder system including a ground glass, a reflector directly behind the lens and between the film spools in the same fore-and-aft zone of the casing, said reflector having a surface oriented to reflect light upward against the ground glass, a second reflector surface located within the same fore-and-aft zone as the film spools and in position to reflect light from the ground glass toward one side of the camera, a third reflector surface which is also within the same fore-and-aft zone as the film spools and in position to reflect light from the second surface downward, and a fourth reflector also in the same fore-and-aft zone with the film spools and in position to reflect the downwardly directed light from the third reflector to an optical opening in the casing at which opening the image is seen erect and with correct sides.

2. A camera comprising a casing in which there are holders for film spools that rotate about spaced, upright and parallel axes in a fore-and-aft zone of the camera casing, a lens at the front of the casing in position to admit light to expose a portion of the film at a film gate between the spools, a reflex finder system including a ground glass, a reflector located directly behind the lens and between the film spools in the same fore-and-aft zone in the casing with the film spools, said reflector having a surface in position to reflect light from the lens upward against the ground glass, a second reflector located above the ground glass and in the same fore-and-aft zone as the film spools and at such an angle that it reflects light from the ground glass toward one side of the camera, a third reflector in the light beam from the second reflector and also located within the same fore-and-aft zone of the camera casing with the film spools, said third reflector being at such an angle to the light beam from the second reflector that it reflects the light beam downward, a fourth reflector that receives the downwardly directed light beam from the third reflector, said fourth reflector being set at such an angle in the casing that it deflects the light beam from the third reflector rearwardly through an optical opening in the back of the casing, at which opening the image is seen erect and with correct sides, and a lens through which the light beam passes and by which the image seen through the optical opening is magnified.

3. A roll film camera having a casing having a back of a shape that has corners, an optical opening through which light passes through the back of the casing at one of said corners, bearings within the casing for holding film spools for rotation about spaced, upright and parallel axes at opposite sides of the casing and in a fore-and-aft zone of the casing, a lens support at the front of the casing for holding a lens that admits light to expose a length of film at a film gate between the spools, a reflex finder system including a ground glass, a reflector located directly behind the lens and between the film spools in the same fore-and-aft zone of the casing with the film spools, said reflector having a surface oriented to reflect light upward against the ground glass, a second reflector located within the same fore-and-aft zone as the film spools and in position to reflect light from the ground glass toward one side of the camera, a third reflector which is also in the same fore-and-aft zone as the film spools and in position to reflect light from the second reflector downward, and a fourth reflector, also in the same fore-and-aft zone with the film spools and in position to reflect the downwardly directed light from the third reflector rearwardly through the optical opening at the corner of the back of the casing.

4. A camera comprising a casing that encloses a fore-and-aft zone in which film spools are held for rotation about spaced, upright and parallel axes at opposite sides of the casing, a lens support on the front of the casing for holding a lens in position to expose a picture on the film at a film gate between the spools, a reflex finder system including a ground glass, a reflector behind the lens and in the same fore-and-aft zone of the casing as the film spools, said reflector being set at an angle to reflect light beams upward from the lens to the ground glass, a second reflector above the ground glass in position to reflect light from the ground glass toward one side of the camera, a third reflector that reflects the light beam from the second reflector downward in the casing, a fourth reflector in position to reflect the light from the third reflector rearwardly through an optical opening in the back in the casing, all of the reflectors being located in the same fore-and-aft zone of the camera casing as the film spools, and the optical opening in the back of the casing being located at a corner of the casing so that the optical opening can be located close to an observer's eye without having any part of the casing extend across in front of the observer's nose.

5. A roll film camera including a casing, supporting means for holding two film spools for rotation above spaced, upright and parallel axes at opposite sides of the casing and in a fore-and-aft zone of the casing, a holder for supporting a lens for admitting light to expose a length of film at a location between the spools, a reflex finder system including a ground glass, a reflector directly behind the lens and in the same fore-and-aft zone as the film spools in position to reflect light from the lens upward against the ground glass, a prism located within the same fore-and-aft zone as the film spools and having a surface in position to reflect light from the ground glass toward one side of the casing, a third reflector which is also within the same fore-and-aft zone as the film spools and in position to reflect light from the prism downward, a fourth reflector, also in the same fore-and-aft zone as the film spools and in position to reflect light from the third reflector to an optical opening in the casing at which opening the image is seen erect and with correct sides, said prism being of a larger size than necessary for reflecting the entire cross section of the light beam from the ground glass, and a mask beyond the light outlet surface of the prism for blocking light that passes through portions of the surface of the light outlet face of the prism near certain edges of the prism so that the illuminated field of vision visible through the finder is limited to the image on the ground glass.

6. A roll-film camera including a casing, supporting means for holding two film spools for rotation about spaced, upright and parallel axes at opposite sides of the casing and in a fore-and-aft zone of the casing, a support at the front of the casing for holding a lens for admitting light to expose a length of film between the spools, a reflex finder system including a ground glass, a reflector directly behind the lens and between the film spools in the same fore-and-aft zone of the casing, said reflector having a surface oriented to reflect light upward against the ground glass, a second reflector surface located within the same fore-and-aft zone as the film spools and in position to reflect light from the ground glass toward one side of the camera, a third reflector surface which is also within the same fore-and-aft zone as the film spools and in position to reflect light from the second surface downward, and a mask within the finder system comprising opaque elements extending along the portion of the light beam that comprises the sides of the image, said opaque elements having mask edges that converge toward one another toward the top of the image.

JOHN A. HAESELER.

REFERENCES CITED

The following references are of record in the file of this patent:

UNITED STATES PATENTS

| Number | Name | Date |
|---|---|---|
| 1,023,931 | Folmer | Apr. 23, 1912 |
| 1,525,657 | Roach | Feb. 10, 1925 |
| 1,539,579 | Kucharski | May 26, 1925 |
| 1,631,303 | Washington | June 7, 1927 |
| 1,687,030 | Mitchell | Oct. 9, 1928 |
| 1,777,419 | Ross | Oct. 7, 1930 |
| 1,840,227 | De Testa | Jan. 5, 1932 |
| 2,005,014 | Tondreau | June 18, 1935 |
| 2,136,148 | Nuchterlein | Nov. 8, 1938 |
| 2,149,217 | Heinsch et al. | Feb. 28, 1939 |
| 2,165,903 | Nuchterlein | July 11, 1939 |
| 2,219,314 | Hoch | Oct. 29, 1940 |
| 2,230,251 | Jochum | Feb. 4, 1941 |
| 2,284,562 | Dittman | May 26, 1942 |
| 2,285,456 | Nowland | June 9, 1942 |
| 2,323,005 | Bertele | June 29, 1943 |
| 2,352,177 | Bolsey | June 27, 1944 |
| 2,442,327 | Soreny | May 25, 1948 |

FOREIGN PATENTS

| Number | Country | Date |
|---|---|---|
| 884,054 | France | Apr. 12, 1943 |

OTHER REFERENCES

Ser. No. 304,702, Kuppenbender (A. P. C.), published May 4, 1943.